Aug. 9, 1960 — J. HALTENBERGER — 2,948,269

FREE PISTON ENGINE

Filed April 16, 1956

INVENTOR.

Jules Haltenberger

United States Patent Office 2,948,269
Patented Aug. 9, 1960

2,948,269

FREE PISTON ENGINE

Jules Haltenberger, Box 131, Rancho Santa Fe, Calif.

Filed Apr. 16, 1956, Ser. No. 578,269

5 Claims. (Cl. 123—46)

The present invention relates to free piston engine powergas generators.

Many combinations of free power piston and air compressors were proposed, here, for simplicity of presentation, a double opposed powergas generator is illustrated. All generators applicant is aware of, include fuel injection, here not shown.

All powergas generators applicant is aware of, incorporate valves at different angles and different usually inaccessible and unserviceable places, and they also include piston travel synchronizers of the usual rack and pinion or rocking beam type, here not shown.

It is the object of my invention to provide a powergas generator with accessible, serviceable and facilely inspectable reed valves.

A further object is, to provide a simple method of air replenishment for the bouncing chambers.

A further object is, to provide piston neck undercut means for compressed air transfer.

Further objects will appear as the description proceeds.

Figure 1:
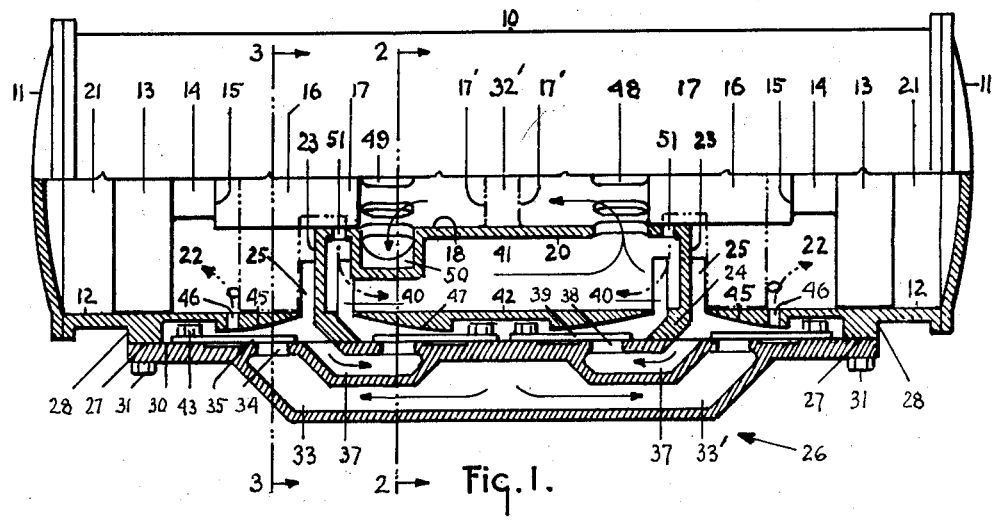
Figure 3:
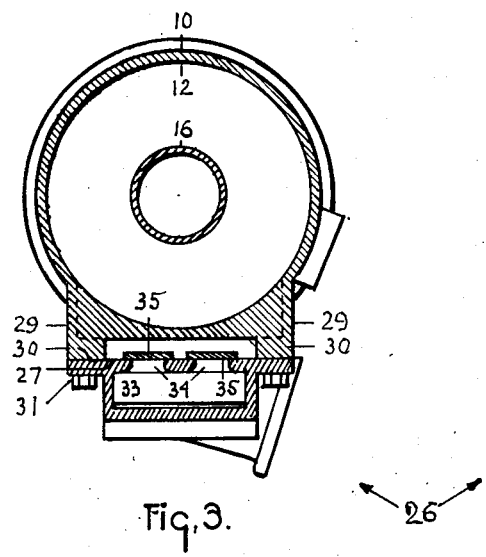
Figure 2:
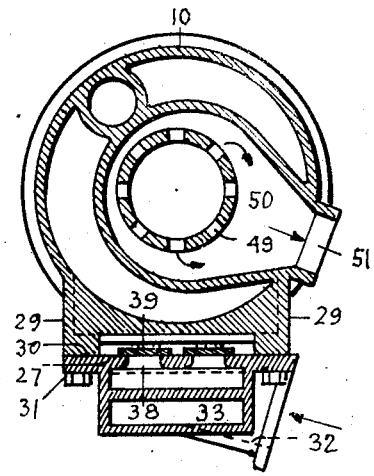

Referring to the drawings: Fig. 1 is a fragmental side elevation of a powergas generator; Fig. 2 is a section taken on line 2—2 of Fig. 1; Fig. 3 is a section taken on line 3—3 of Fig. 1.

Referring to Figs. 1 to 3 inclusive, it will be seen, that a powergas outer housing 10, is provided with end covers 11. The housing ends are formed into cylinder bores 12 for the reciprocal operation of large pistons 13, they are integral with undercut piston necks 14 having cut inner edges 15, and small diameter power pistons 16, with end walls 17, operating in a cylinder bore piston slide surface 18, in an inner generator housing 20. The chambers disposed outside of the travel of pistons 13 are the bouncing chambers 21, they fulfill the missions comparable to usual engine flywheels. Parts 13, 14, 15, 16 and 17 form a piston unit.

The large piston travel inner spaces form air compressor chambers 22, having sealing walls 23, they laterally terminate in thickened wall portions 24, these chambers are provided with air passage openings 25.

The generator outer housing for the hermetically sealed adaption of a manifold unit housing generally at 26, is provided with a single plane machined adopting surface 27, on the outer surfaces of end walls 28, to them connected side walls 29 and the interconnecting thickened wall portions 24. The manifold unit is provided with a machined single plane mounting surface 30. The manifold unit is secured to the housing as by capscrews 31.

The engine combustion chamber 32' is disposed inbetween the ends of the contracted power pistons, indicated in Fig. 1 by chain lines 17'. A fuel explosion therein drives the power pistons and piston units respectively apart, substantially to the position shown on the drawings, they are decelerated by the air compressed in the bouncing chambers, the built up pressure in the bouncing chambers drives the piston units back for the subsequent explosion and further cycling.

While the large pistons travel outwardly, the low pressure they cause in their wake, soaks in ambient air (or air under pressure, if air supercharger is used, and in the appended claims both shall be referred to as ambient), through air inlet port 32, substantially equal length inlet ducts 33 and 33', terminal valve ports 34 having valve seats, inwardly opening inlet reed valves 35, and through openings 25 respectively.

When the large pistons travel inwardly, they compress the air in chambers 22 and the compressed air through opening 25, high pressure air passage 37, terminal valve ports 38 having valve seats, inwardly opening outlet reed valves 39, and through openings 40, the compressed air reaches the scavenge air reservoir 41, having on the manifold side a wall 42. It will be noted, that the inlet and outlet valves both open inwardly, and they are secured as by capscrews 43 on the same machined single plane mounting surface 30. Therefore, at the facilely removable manifold unit 26, the reed valves and their valve seats become exposed for inspection and servicing.

As is clear from the drawings, over the inlet valves, valve flexing limitors 45 are provided, in them openings 46 communicate with the bouncing chambers for their replenishment with compressed air when the large pistons are substantially at their extreme inward travel and uncover these openings, thereby increase the engine cycling. Over the outlet valves flex limitors 47 are provided.

When the power pistons reach their outward positions, illustrated in the drawings, one of them uncovers ports 48 in the inner housing, to permit the high pressure scavenge air from reservoir 41 to clean and cool the combustion chamber. The high pressure scavenge air now further heated, with increased pressure escapes through duplicate ports 49 uncovered by the other piston, and the powergas escapes to collector 50, and through exit port 51, it can be guided into an operating gas turbine, which can be constructed of inexpensive materials, inasmuch as the powergas is usually under 1000° Fahrenheit temperature.

As is clear from the drawings, the power pistons reciprocate in the inner generator housing, near their sealing walls the housing is provided with multiple compressed air passage holes 51 (only one is shown on each side). At the piston units substantially extreme inward position, as indicated by chain lines in Fig. 1, the power piston neck undercuts expose holes 51, for transferring a part of the compressed air at its substantially highest pressure, directly into the scavenge air reservoir, thereby increasing the engine's volumetric and thermal efficiency.

In the appended claims "machined" shall mean a surface applicable to hermetical healing. In an assembled engine the reed valves open inwardly, the very same valves when on a manifold unit as described as opening outwardly.

While I have herein shown and described only certain specific embodiments of my invention and have suggested only certain possible modifications, it will be appreciated that many changes and variations can be made to suit particular conditions and embodiments of use, without departing from the spirit and scope of my invention.

What applicant claims as his invention:

1. In a free piston engine powergas generator an outer housing, a machined single plane adapting surface thereon, a piston having a bouncing chamber at one side, and an air piston compressor on the other, reciprocating in said housing, a manifold unit having a single plane mounting surface secured on said first mentioned surface, said unit including an ambient air inlet duct that terminates in an inlet valve port having a valve seat with an inwardly opening reed valve thereon, an air passage from said valve to said compressor, and from said compressor an air passage to a high pressure passage disposed in said manifold unit and terminating in an outlet valve port having a valve seat and an inwardly opening reed valve thereon, and an air passage from said outlet valve to a scavenging air reservoir, said reed valves are operatively secured on said manifold single plane surface, whereby, at manifold removal the reed valves and their respective valve seats become accessible for inspection and servicing.

2. The invention defined in claim 1, wherein, the air passage adjacent to the inlet valve is provided with openings leading into the bouncing chamber when said openings are exposed at the substantially extreme inward position of said piston, whereby, the bouncing chamber is replenished with compressed ambient air for increased cycling.

3. A manifold unit for a double opposed free piston engine powergas generator having a housing with a machined single plane manifold adopting surface thereon, and a pair of air compressors and a scavenge air reservoir therein comprising, a housing having a machined single plane mounting surface thereon, an air inlet port with a pair of substantially equal length air ducts, each terminating in a valve port with a valve seat and an outwardly opening reed inlet valve thereon, high pressure air passages terminating in valve ports with valve seats and outwardly opening reed outlet valves thereon, and means operatively securing said valves to said single plane surface.

4. In a free piston engine powergas generator an outer housing, a piston having a bouncing chamber at one side and an air compressor on the other, reciprocating in said housing, an air inlet valve, an air passage from said valve to said air compressor, said air passage provided with openings leading into the bouncing chamber when said openings are exposed at the substantially extreme air compressing position of said piston, whereby the bouncing chamber is replenished with compressed ambient air for increased cycling.

5. A manifold unit for a free piston engine powergas generator having a housing with a manifold adopting surface thereon, and an air compressor and a scavenge air reservoir therein comprising, a housing having a mounting surface thereon, and an air inlet port having an air duct and terminating in a valve port with an outwardly opening inlet valve thereon, a high compression air passage terminating in a valve port with an outwardly opening outlet valve thereon, means for removably securing said manifold unit to said generator housing whereby, by the removal of said manifold unit the inlet and outlet valves and seats are exposed for inspection or servicing.

References Cited in the file of this patent

UNITED STATES PATENTS

| 1,111,074 | Lawler | Sept. 22, 1914 |
| 2,200,892 | Pescara | May 14, 1940 |
| 2,344,058 | Pescara | Mar. 14, 1944 |
| 2,554,762 | Welsh et al. | May 29, 1951 |
| 2,581,600 | Pescara | Jan. 8, 1952 |
| 2,619,797 | Haworth | Dec. 2, 1952 |
| 2,678,032 | Mallory | May 11, 1954 |
| 2,702,985 | Howell | Mar. 1, 1955 |

FOREIGN PATENTS

| 594,833 | Great Britain | Nov. 20, 1947 |
| 507,250 | Canada | Nov. 9, 1954 |